United States Patent

Meir et al.

(10) Patent No.: US 9,424,197 B2
(45) Date of Patent: Aug. 23, 2016

(54) HARD DISK DRIVE WITH OPTIONAL CACHE MEMORY

(75) Inventors: Avraham Meir, Rishon Lezion (IL); Yoram Zylberberg, Tel Aviv (IL)

(73) Assignee: SANDISK IL LTD.

(*) Notice: Subject to any disclaimer, the term of this patent is extended or adjusted under 35 U.S.C. 154(b) by 0 days.

(21) Appl. No.: 13/450,340

(22) Filed: Apr. 18, 2012

(65) Prior Publication Data

US 2012/0233385 A1    Sep. 13, 2012

Related U.S. Application Data

(62) Division of application No. 11/198,177, filed on Aug. 8, 2005, now abandoned.

(60) Provisional application No. 60/670,594, filed on Apr. 12, 2005.

(51) Int. Cl.
*G06F 12/00* (2006.01)
*G06F 13/00* (2006.01)
*G06F 13/28* (2006.01)
*G06F 12/08* (2016.01)

(52) U.S. Cl.
CPC ...... *G06F 12/0873* (2013.01); *G06F 2212/601* (2013.01)

(58) Field of Classification Search
CPC ............ G06F 12/0866; G06F 12/0868; G06F 12/0873; G06F 2212/225
USPC ....................................................... 711/113
See application file for complete search history.

(56) References Cited

U.S. PATENT DOCUMENTS

| 4,399,503 | A |   | 8/1983 | Hawley |
|---|---|---|---|---|
| 5,133,060 | A |   | 7/1992 | Weber et al. |
| 5,321,814 | A | * | 6/1994 | Barajas et al. ............ 710/8 |
| 5,325,509 | A |   | 6/1994 | Lautzenheiser |
| 5,347,182 | A | * | 9/1994 | Sauvage ............ 326/101 |
| 5,584,012 | A |   | 12/1996 | Kojima et al. |

(Continued)

FOREIGN PATENT DOCUMENTS

WO    WO/00/10094    *    2/2000

OTHER PUBLICATIONS

Non-Final Office Action mailed Jul. 20, 2011 in U.S. Appl. No. 11/198,177, 12 pages.

(Continued)

*Primary Examiner* — Charles Rones
*Assistant Examiner* — Sidney Li
(74) *Attorney, Agent, or Firm* — Toler Law Group, PC (57) ABSTRACT

A computer system includes a hard disk drive, a processor coupled to the hard disk drive, and a cache interface coupled to the processor and detachably connectable to a cache memory. The processor is adapted, subsequent to an initial interrogation of the cache interface, to determine whether the cache memory is connected to the cache interface by inspecting an indication of the presence or the absence of the cache memory, the indication being stored in a register in the processor or in a memory associated with the processor such that the inspecting avoids repeat interrogation of the cache interface, to communicate with the cache memory and the hard disk drive such that the processor has access to the cache memory when the cache memory is connected to the cache interface, and to communicate with the hard disk drive when the cache memory is disconnected from the cache interface.

25 Claims, 5 Drawing Sheets

(56) References Cited

U.S. PATENT DOCUMENTS

| | | | |
|---|---|---|---|
| 5,586,291 A | | 12/1996 | Lasker et al. |
| 5,636,355 A | * | 6/1997 | Ramakrishnan .... G06F 12/0804 |
| | | | 711/113 |
| 5,638,506 A | * | 6/1997 | Peterson et al. ............. 714/6.13 |
| 5,860,083 A | | 1/1999 | Sukegawa |
| 6,028,725 A | | 2/2000 | Blumenau |
| 6,480,933 B1 | | 11/2002 | Cargemel et al. |
| 6,665,755 B2 | * | 12/2003 | Modelski et al. ............. 710/100 |
| 6,725,342 B1 | | 4/2004 | Coulson |
| 6,754,725 B1 | * | 6/2004 | Wright et al. ..................... 710/8 |
| 6,785,132 B1 | | 8/2004 | Medin et al. |
| 2002/0156972 A1 | * | 10/2002 | McKnight ........... G06F 12/0804 |
| | | | 711/114 |
| 2002/0176416 A1 | * | 11/2002 | Ben-Ze'ev et al. ............ 370/389 |
| 2004/0225915 A1 | * | 11/2004 | Johnson .............. G06F 11/2007 |
| | | | 714/13 |
| 2005/0125602 A1 | | 6/2005 | Ehrlich |
| 2005/0246487 A1 | | 11/2005 | Ergan et al. |
| 2006/0090031 A1 | * | 4/2006 | Kirshenbaum et al. ....... 711/113 |
| 2006/0230226 A1 | | 10/2006 | Meir et al. |

OTHER PUBLICATIONS

Final Office Action mailed Feb. 28, 2011 in U.S. Appl. No. 11/198,177, 38 pages.
Non-Final Office Action mailed Aug. 2, 2010 in U.S. Appl. No. 11/198,177, 33 pages.
Final Office Action mailed Mar. 15, 2010 in U.S. Appl. No. 11/198,177, 24 pages.
Non-Final Office Action mailed Aug. 27, 2009 in U.S. Appl. No. 11/198,177, 23 pages.
Final Office Action mailed Feb. 18, 2009 in U.S. Appl. No. 11/198,177, 27 pages.
Non-Final Office Action mailed Jul. 25, 2008 in U.S. Appl. No. 11/198,177, 23 pages.
Advisory Action mailed May 13, 2008 in U.S. Appl. No. 11/198,177, 3 pages.
Final Office Action mailed Dec. 13, 2007 in U.S. Appl. No. 11/198,177, 17 pages.
Non-Final Office Action mailed Jun. 25, 2007 in U.S. Appl. No. 11/198,177, 11 pages.

* cited by examiner

HARD DISK DRIVE WITH OPTIONAL CACHE MEMORY

REFERENCE TO EARLIER-FILED APPLICATIONS

This divisional patent application claims priority from U.S. patent application Ser. No. 11/198,177 filed Aug. 8, 2005, which claims the benefit from U.S. Provisional Patent Application No. 60/670,594, filed Apr. 12, 2005. The contents of these applications are incorporated by reference herein in their entirety.

FIELD OF THE DISCLOSURE

The present disclosure relates to data storage devices and, more particularly, to a hard disk drive with an optional cache memory.

BACKGROUND

Almost every modern electronic system needs a storage device. One of the most popular storage devices is the hard disk drive. Hard disk drives typically are used as mass storage devices in systems such as personal computers, media players, set-top boxes and many other systems.

The main advantage of hard disk drives over other nonvolatile data storage devices such as flash memories is their cost efficiency per bit of stored data. One of the limitations of hard disk drives, particularly with regard to their use in portable devices, is their relatively high power consumption. Among the portable devices that usually include hard disk drives are laptop computers, portable media players and GPS receivers. Such devices typically are powered by rechargeable batteries. A major constraint on such devices is the time that they can operate on a single battery charge. It therefore is important to design components of these systems, notably the hard disk drives of these systems, that are major consumers of power, to be economical in their use of power.

Figure 1:
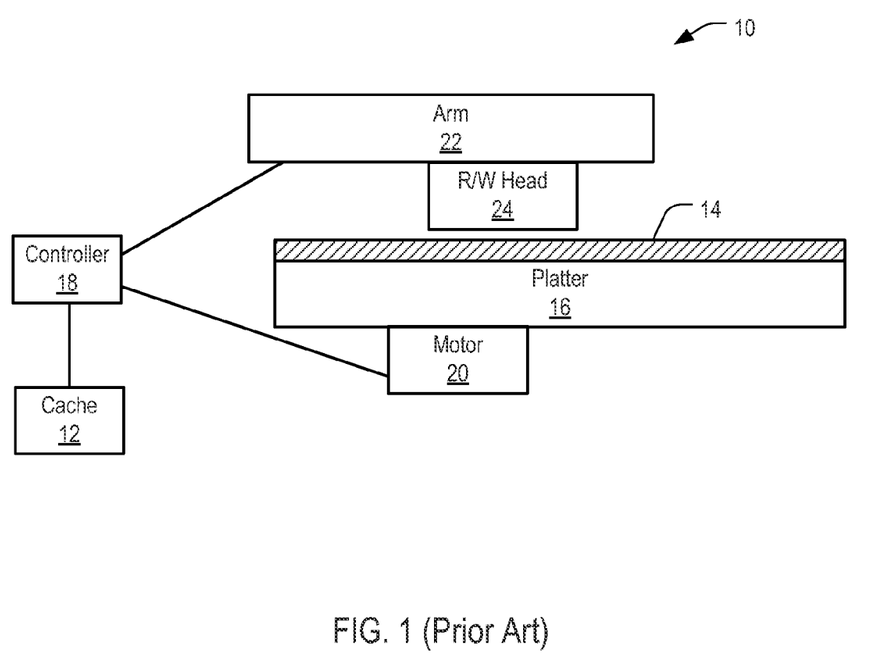
FIG. 1 is a high-level schematic block diagram of a prior art hard disk drive.

One of the known methods for minimizing the power consumption of a hard disk drive is the inclusion in the hard disk drive of an auxiliary memory such as a flash memory that is used as a data cache. FIG. 1 is a high-level schematic block diagram of a prior art hard disk drive (HDD) 10 that uses a flash memory 12 as a cache memory. The data recording medium of HDD 10 is a magnetic recording medium 14 on a disk-like platter 16. A controller 18 writes to magnetic medium 14 and reads from magnetic medium 14 using an electromechanical mechanism that includes a motor 20 for spinning platter 16, a read-write head 24 for reading and writing data bits at arbitrarily selected locations on platter 16 and an arm 22 for moving read-write head 24 to those locations. Cache memory 12 is used to limit the number of accesses to HDD 10 by its host device in which motor 20 is powered up. Limiting these accesses reduces the power consumption of HDD 10 and also increases the reliability of the overall system, for two reasons. First, read-write head 24 is parked for a larger portion of the time and so is the likelihood of platter 16 being damaged as a consequence of rough handling is decreased. Second, flash memory 12, having no moving parts, typically is more reliable than magnetic medium 14 as a data storage medium, reducing the chance of data loss in case of system failure.

The degrees of freedom available to the designer of a system that includes HDD 10 include:

1. Physical location: whether cache memory 12 is physically part of HDD 10 or is elsewhere in the host system, for example on the motherboard of the host system.
2. Cache management responsibility: whether caching is managed by the host's operating system or by controller 18.
3. Caching medium: volatile (e.g., DRAM) vs. non-volatile (e.g. flash).

A typical method of HDD cache management is as follows: When HDD 10 receives data to store as a consequence of a write operation by the host of HDD 10, controller 18 writes the data to cache memory 12. When cache memory 12 is full, controller 18 transfers the data to magnetic medium 14 of platter 16. This method of operating HDD 10 saves substantially in power consumption. How much power is saved, vs. always writing to platter 16, is a function of the number of write accesses and the size of cache memory 12. Calculations for typical laptop computers (HDD capacity around 60 GB, flash memory capacity around 64-128 MB) show that the amount of data written per hour to cache memory 12 is a tiny fraction of the capacity of a typical platter 16. Using a relatively small cache memory 12 can give a 20%-30% reduction in power consumption in a typical consumer device.

The trade-off in such caching is between the additional cost of cache memory 12 vs. the power saved. This is an important limitation, as hard disk drives have become a standard commodity that is used in a wide variety of applications. However, in some applications, low cost is a more important constraint than low power consumption; in other applications, low power consumption is a more important constraint than low cost; and in yet other applications, both constraints are important. The exact fine tuning between cost and power thus varies from one application to another, and can even vary from one user to another.

There is thus a widely recognized need for, and it would be highly advantageous to have, a commodity hard disk drive that can be adapted easily to the cost and power constraints of a wide variety of applications.

SUMMARY

According to the present disclosure there is provided a computer system including: (a) a hard disk drive; and (b) an interface for optionally operationally connecting, to the computer system, a cache memory for the hard disk drive.

According to the present disclosure there is provided a hard disk drive including: (a) a nonvolatile medium for storing data; (b) a controller for writing the data to the nonvolatile medium and for reading the data from the nonvolatile medium; and (c) an interface for optionally operationally connecting, to the controller, a cache memory for the nonvolatile medium.

According to the present disclosure there is provided a method of operating a hard disk drive that includes a nonvolatile data storage medium, including the steps of: (a) providing an interface for optionally operationally associating a cache memory with the hard disk drive; and (b) in exchanging data with the hard disk drive, determining whether the cache memory is operationally associated with the hard disk drive.

According to the present disclosure there is provided a method of producing computer systems, including the steps of: (a) providing each computer system with a respective hard disk drive; (b) providing each computer system with a respective interface for optionally operationally connecting, to the each computer system, a cache memory for the respective hard disk drive of the each computer system; and (c) in configuring each computer system for delivery to a respective customer, deciding whether to operationally connect the cache memory to the each computer system at the respective interface of the each computer system.

According to the present disclosure there is provided a computer-readable storage medium having computer-readable code embodied on the computer-readable storage medium, the computer-readable code for exchanging data with a hard disk drive in a computer system that includes an interface for optionally operationally connecting, to the computer system, a cache memory for the hard disk drive, the hard disk drive including a nonvolatile data storage medium, the computer-readable code including: (a) program code for determining whether the cache memory is operationally connected to the computer system; and (b) program code for, if the cache memory is operationally connected to the computer system, then, in writing the data to the hard disk drive: (i) if the cache memory is full: (A) copying contents of the cache memory to the nonvolatile data storage medium, and (B) writing the data to the nonvolatile data storage medium, and (ii) otherwise, writing the data to the cache memory.

A computer system of the present disclosure includes a hard disk drive and an interface for optionally operationally connecting, to the computer system, a cache memory for the hard drive. That the connection of the cache memory to the computer system is "optional" means that the computer system is fully operational even without the cache memory. The cache memory, if present, merely enhances the operation of the computer system, for example by conserving power.

Preferably, the interface is for reversibly operationally connecting the cache memory to the computer system.

In one variant of the computer system of the present disclosure, the computer system includes a mechanism, such as a system bus, that is separate from the hard disk drive and that is for operationally connecting the hard disk drive to the interface. Preferably, such a computer system also includes an operating system for using the cache memory to cache data that are to be written to the hard disk drive. Most preferably, such caching is the only purpose for which the operating system uses the cache memory. Note that using the cache memory "only" for caching data to be written to the hard disk drive does not preclude reading, from the cache memory, data that are waiting to be transferred to the hard disk drive.

In another variant of the computer system, the hard disk drive includes a controller, and the interface is directly operationally connected to the controller.

A hard disk drive of the present disclosure includes a nonvolatile (e.g., magnetic or optical) medium for storing data, a controller for writing the data to the nonvolatile medium and for reading the data from the nonvolatile medium, and an interface for optionally operationally connecting, to the controller, a cache memory for the nonvolatile medium. That the connection of the cache memory to the controller is "optional" means that the hard disk drive is fully operational even without the cache memory. The cache memory, if present, merely enhances the operation of the hard disk drive, for example by conserving power.

Preferably, if the nonvolatile medium is a magnetic medium, then the hard disk drive includes an electromechanical mechanism that the controller uses to write the data to the magnetic medium and to read the data from the magnetic medium. Most preferably, the electromechanical mechanism provides the controller with random access to the magnetic medium.

Although the scope of the present disclosure, in the case of both the computer system and the hard disk drive, includes volatile cache memories, it is preferred that the cache memory be non-volatile, for example a flash memory.

The scope of the present disclosure also includes a method of operating a hard disk drive that includes a nonvolatile data storage medium. An interface is provided for optionally operationally associating a cache memory with the hard disk drive. That the association is "optional" means that the hard disk drive is fully operational even in the absence of the cache memory. The cache memory, if present, merely enhances the operation of the hard disk drive, for example by conserving power. In exchanging data with the hard disk drive, i.e., in writing data to the hard disk drive or in reading data from the hard disk drive, it first is determined whether the cache memory is in fact operationally associated with the hard disk drive. If the cache memory is in fact operationally associated with the hard disk drive, then:

In writing new data (i.e., data not yet cached) to the hard disk drive, if the cache memory is full, meaning that there is no room in the cache memory to write the new data, the contents of the cache memory are copied to the nonvolatile data storage medium and the new data are written to the nonvolatile data storage medium. If the cache memory is not full, then the data are written to the cache memory.

or:

In reading data from the hard disk drive, it first is determined whether the data reside in the cache memory. If the data reside in the cache memory, then the data are read from the cache memory. If the data do not reside in the cache memory, then the data are read from the nonvolatile data storage medium.

The scope of the present disclosure also includes a method of producing computer systems. Each computer system is provided with a respective hard disk drive and with a respective interface for optionally operationally connecting, to the computer system, a cache memory for the computer system's hard disk drive. That the connection of the cache memory to the computer system is "optional" means that the computer system is fully operational even without the cache memory. The cache memory, if present, merely enhances the operation of the computer system, for example by conserving power. Finally, in configuring each computer system for delivery to a customer thereof, it is decided whether to actually operationally connect a cache memory for the computer system's hard disk drive to the computer system's interface. Whether the computer system is delivered to the customer with or without a cache memory for the hard disk drive operationally connected to the computer system depends on the customer's requirements.

Preferably, each computer system is provided with its own mechanism, separate from its hard disk drive, for operationally connecting the hard disk drive to the interface. Alternatively, each hard disk drive includes a controller, and each computer system's interface is directly operationally connected to the controller of that computer system's hard disk drive.

The cache memories could be volatile memories or, preferably and alternatively, non-volatile memories such as flash memories.

The scope of the present disclosure also includes a computer-readable storage medium having embodied thereon computer-readable code for implementing the method of the present disclosure for operating a hard disk drive.

The present disclosure provides many advantages over the prior art. Among these advantages are the following:

A consumer or an original equipment manufacturer can select how much cache to attach to his/her/its hard disk drive. It is up to the consumer or to the original equipment manufacturer, rather than the manufacturer of the hard disk drive, to bear the cost of cache memory. Omitting the cache memory for a user who does not need one bears only a small penalty in cost, the cost of the interface.

Having to keep on hand only one kind of hard disk drive or only one kind of computer system simplifies the inventory tasks of a vendor of hard disk drives and computer systems of the present disclosure.

By purchasing a hard disk drive or a computer system of the present disclosure without a cache memory, a customer saves money up front. The customer is free at any time to invest in an upgrade to a hard disk drive or a computer system with caching. The customer is free to exercise this option when prices of cache memories are low.

A vendor of a hard disk or computer system of the present disclosure adds value to its product at minimal cost and minimal operational overhead. A vendor can target products of the same product line separately to customers who need caching and to customers who do not need caching.

BRIEF DESCRIPTION OF THE DRAWINGS

The disclosure is herein described, by way of example only, with reference to the accompanying drawings, wherein.

DETAILED DESCRIPTION

The present disclosure is of a hard disk drive and a related computer system that can be configured easily, per application, to optimize cost vs. power consumption.

The principles and operation of a hard disk drive according to the present disclosure may be better understood with reference to the drawings and the accompanying description.

Although the scope of the present disclosure extends to hard disk drives that use any kind of nonvolatile data storage media, for example optical storage media, the description herein of the preferred embodiments of the present disclosure is in terms of a hard disk drive whose nonvolatile data storage medium is a magnetic medium such as magnetic medium 14. It will be clear to those skilled in the art how to apply the principles of the present disclosure to other nonvolatile data storage media.

Figure 2:
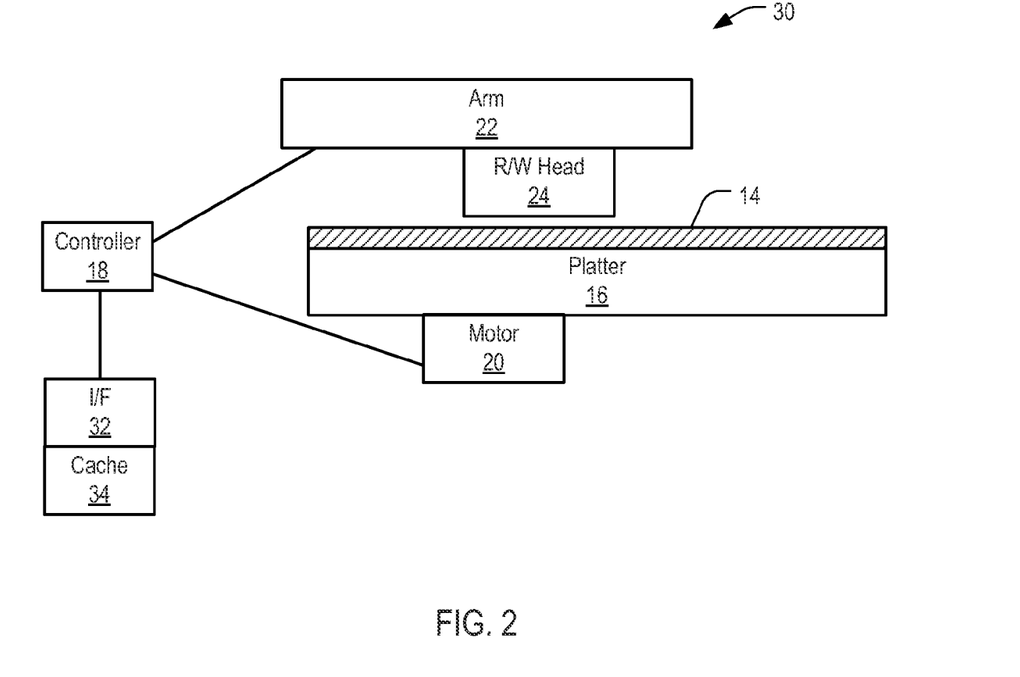
FIG. 2 is a high-level schematic block diagram of a hard disk drive of the present disclosure.

Referring again to the drawings, FIG. 2 illustrates a hard disk drive 30 of the present disclosure. Hard disk drive 30 shares most of its components with hard disk drive 10. The principal difference between hard disk drive 10 and hard disk drive 30 is that instead of a hard-wired cache memory 12, hard disk drive 30 includes an interface 32 for an optional cache memory 34. Interface 32 is a standard interface for reversibly connecting a memory such as a flash memory to controller 18. For example, in some versions of HDD 30, interface 32 is a standard USB interface; in other versions of HDD 30, interface 32 is a slot such as commonly is used in appliances such as digital cameras and MP3 players for inserting a flash memory card. Although in principle cache memory 34 need not be a non-volatile memory, in the overwhelming majority of cases cache memory 34 is a non-volatile memory such as a flash memory. Usually, the reversibility of the operational connection between interface 32 and cache memory 34 is preserved, to allow a user of a system that includes HDD 30 to swap cache memories 34 (e.g. to upgrade to a larger cache memory 34) on a per-application basis. Optionally, cache memory 34 is sealed permanently to interface 32. For example, an original equipment manufacturer may seal cache memory 34 permanently to interface 32 of a HDD 30 that the original equipment manufacturer purchases from a manufacturer of hard disk drives.

Interface 32 is adapted to allow controller 18 to sense the presence and size of cache memory 34. For example, if interface 32 is a USB interface, then when cache memory 34 is connected to interface 32, or when HDD 30 is powered up, controller 18 conducts an enumeration process according to the USB standard to determine whether cache memory 34 is present in interface 32 and, if cache memory 34 is present in interface 32, what the size of cache memory 34 is. In the absence of cache memory 34, controller 18 always writes incoming data directly to magnetic medium 14 of platter 16. If cache memory 34 is present, controller 18 caches incoming data in cache memory 34, as described above, until cache memory 34 is full, at which time controller 34 transfers the contents of cache memory 34 to magnetic medium 14 of platter 16 and erases cache memory 34.

Figure 3:
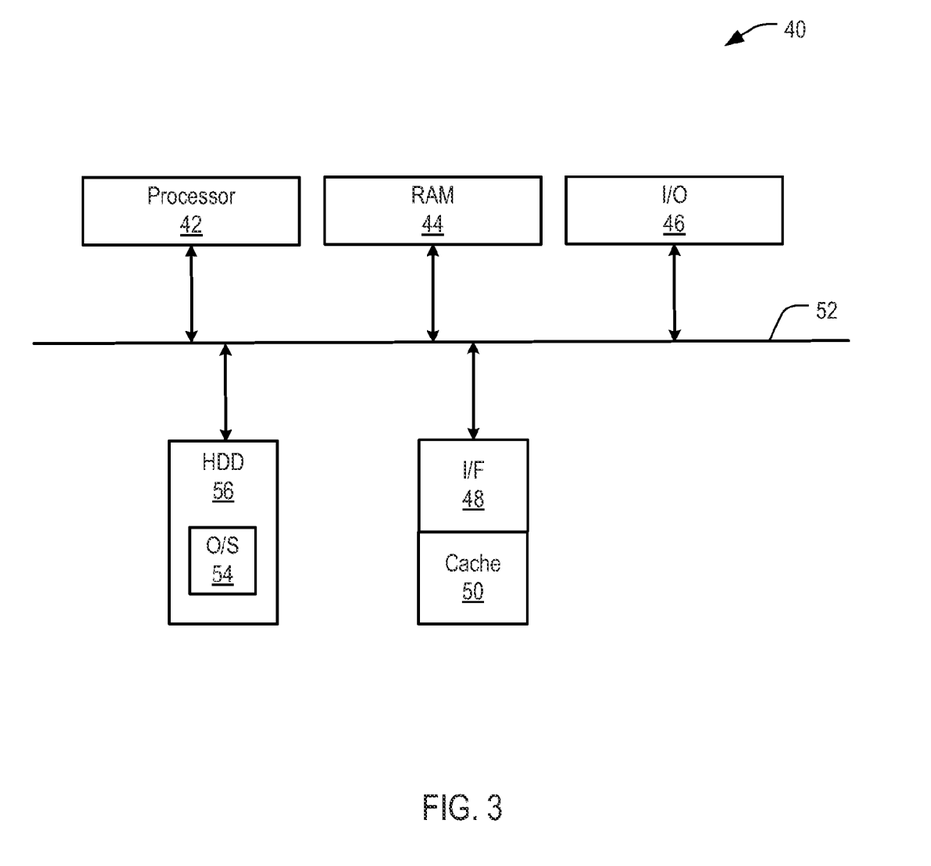
FIG. 3 is a partial high-level schematic block diagram of a computer system of the present disclosure.

HDD 30 of FIG. 2 is a hardware/firmware implementation of the present disclosure. FIG. 3 illustrates a software implementation of the present disclosure. Specifically, FIG. 3 is a partial high-level schematic block diagram of a computer system 40 of the present disclosure. System 40 includes a processor 42; a RAM 44; input and output devices such as a keyboard and a display screen, represented collectively by an I/O block 46; a hard disk drive 56 that is similar to prior art hard disk drive 10 except for lacking a cache memory; and an interface 48 for optionally reversibly connecting to system 40 a cache memory 50 that is used for caching writes to HDD 10. Components 42, 44, 46, 48 and 56 communicate with each other via a common system bus 52. Among the data stored on HDD 56 is the code of an operating system 54. When system 40 is powered up, processor 42 downloads the code of operating system 54 to RAM 44 and then executes the code of operating system 54 from RAM 44 to manage the operation of system 40. HDD 56 thus is an example of a computer-readable storage medium in which is embedded computer-readable code for implementing the method of the present disclosure. Note that actions described herein as being performed "by operating system 54" actually are operations that are performed by processor 42 by executing code of operating system 54.

Like interface 32, interface 48 is a standard interface for reversibly connecting a memory such as a flash memory to system 40. For example, in some versions of system 40, interface 48 is a standard USB interface; in other versions of system 40, interface 48 is a slot such as commonly is used in appliances such as digital cameras and MP3 players for inserting a flash memory card. Although cache memory 50, like cache memory 34, need not be a non-volatile memory, in the overwhelming majority of cases cache memory 50 is a non-volatile memory such as a flash memory. As in the case of the connection between interface 32 and cache memory 34, the operational connection between interface 48 and cache memory 50 usually is kept reversible.

Also like interface 32, interface 48 is adapted to allow processor 42, under the control of operating system 54, to sense the presence and size of cache memory 50. The code of operating system 54 includes code for sensing the presence and size of cache memory 50 when system 40 is powered up. A flag that indicates the presence or absence of cache memory 50 then is set in a register in processor 42 or else in RAM 44. If cache memory 50 is present, then the size of cache memory 50 is recorded in another register in processor 42 or alternatively in RAM 44. Subsequently, operating system 54 tests the presence and size of cache memory 50 by inspecting the flag and the recorded size, rather than by interrogating interface 48. The code of operating system 54 also includes code for using cache memory 50 as a cache for HDD 56 if cache memory 50 is present. In the absence of cache memory 50, when operating system 54 receives an instruction from an application program to write data to HDD 56, operating system 54 writes those data directly to HDD 56. If cache memory 50 is present, then when operating system 54 receives an instruction from an application program to write data to HDD 56, operating system 54 instead first attempts to write the data to cache memory 50. If cache memory 50 is full, then operating system 54 writes the data to HDD 56, copies the contents of cache memory 50 to HDD 56, and erases cache memory 50.

Although in principle cache memory 50 is available to operating system 54 for any purpose for which operating system 54 needs a memory, it is preferable to restrict the use of cache memory 50 by operating system 54 to the caching of data to be written to hard disk 56.

Figure 4:
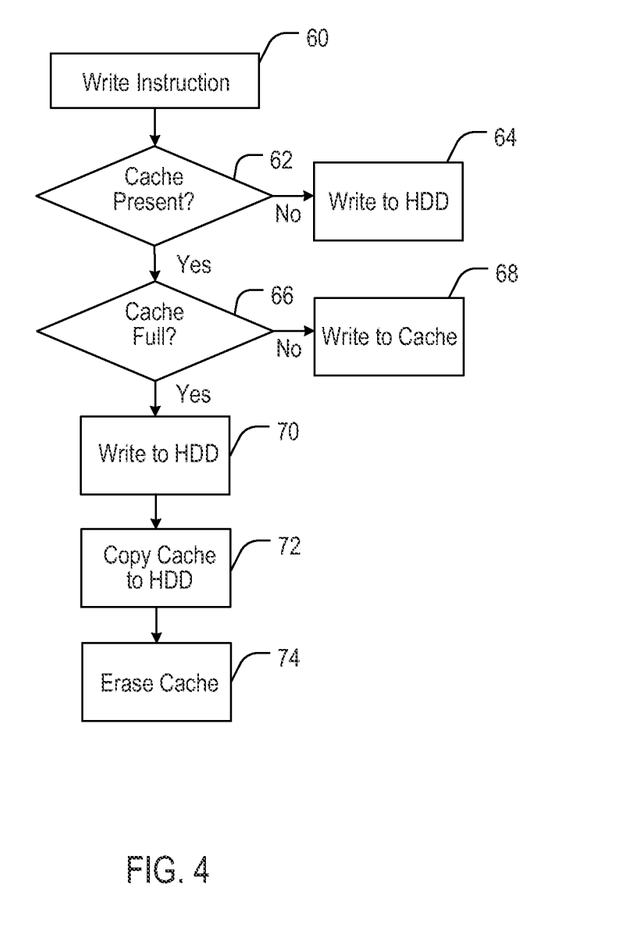
FIG. 4 is a flow chart of writing to a hard disk drive according to the present disclosure.

FIG. 4 is a flow chart of writing to HDD 30 or 56. In block 60, controller 18 of HDD 30 receives an instruction from the host of HDD 30 to write data to platter 16, or operating system 54 receives an instruction from an application program to write data to HDD 56. In block 62, controller 18 or operating system 54 determines whether cache memory 34 or 50 is present. If cache memory 34 or 50 is absent, then in block 64, controller 18 writes the data directly to magnetic medium 14 of platter 16, or operating system 54 writes the data directly to HDD 56. If cache memory 34 or 50 is present, then in block 66, controller 18 or operating system 54 determines whether cache memory 34 or 50 is full. If cache memory 34 or 50 is not full, then in block 68 controller 18 or operating system 54 writes the data to cache memory 34 or 50. If cache memory 34 or 50 is full, then in block 70 controller 18 writes the data directly to magnetic medium 14 of platter 16, or operating system 54 writes the data directly to HDD 56. Then, in block 72, controller 18 copies the contents of cache memory 34 to magnetic medium 14 of platter 16, or operating system 54 copies the contents of cache memory 50 to HDD 56. Finally, in block 74, controller 18 or operating system 54 erases cache memory 34 or 50.

Figure 5:
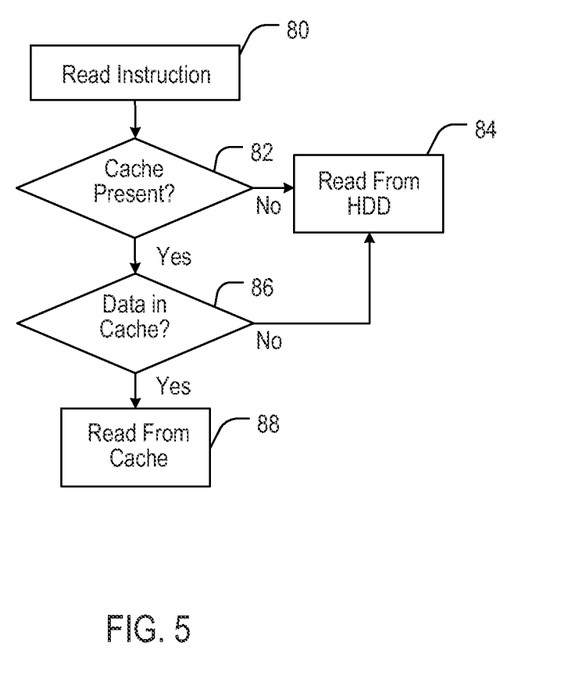
FIG. 5 is a flow chart of reading from a hard disk drive according to the present disclosure.

FIG. 5 is a flow chart of reading from HDD 30 or 56. In block 80, controller 18 of HDD 30 receives an instruction from the host of HDD 30 to read data from platter 16, or operating system 54 receives an instruction from an application program to read data from HDD 56. In block 82, controller 18 or operating system 54 determines whether cache memory 34 or 50 is present. If cache memory 34 or 50 is absent, then in block 84, controller 18 reads the data directly from magnetic medium 14 of platter 16, or operating system 54 reads the data directly from HDD 56. If cache memory 34 or 50 is present, then data that were written recently to HDD 30 or 56 may still be in cache memory 34 or 50, making it unnecessary to expend the time and power needed to read the data from platter 16 or from HDD 56. Therefore, in block 86, controller 18 or operating system 54 determines whether the requested data are present in cache memory 34 or 50. If the requested data are present in cache memory 34 or 50, then in block 88 controller 18 or operating system 54 reads the data from cache memory 34 or 50. Otherwise, in block 84, controller 18 reads the data directly from magnetic medium 14 of platter 16, or operating system 54 reads the data directly from HDD 56.

The present disclosure, as described above, supports an innovative method of producing computer systems. The computer systems are manufactured with hard disk drives and with interfaces for cache memories as described above. The interfaces could be integral to the hard disk drives, if the hard disk drives are configured like HDD 30; or alternatively the interfaces could be coupled to the hard disk drives via a system bus as in computer system 40. As orders for computer systems are received, the producer decides whether to fill each order with a computer system that includes a cache memory 34 or 50 operationally connected to that computer system's interface 32 or 48 or, alternatively, to deliver the computer system without cache memory 34 or 50, depending on the customer's requirements.

While the disclosure has been described with respect to a number of embodiments, it will be appreciated that many variations, modifications and other applications may be made.

What is claimed is:

1. A computer system comprising:
    a processor coupled to a bus and configured to read a value of a flag;
    a hard disk drive coupled to the processor;
    a cache memory interface coupled to the processor via the bus, the cache memory interface configured to be detachably connectable to cache memory; and
    the processor configured to:
        detect a connection of the cache memory at the cache memory interface;
        responsive to detecting the connection of the cache memory at the cache memory interface, use the cache memory as a hard disk drive cache based on the value of the flag; and
        in response to an instruction to write data to the hard disk drive, if the cache memory is full, write the data to the hard disk drive and copy content of the cache memory to the hard disk drive.

2. The computer system of claim 1, wherein the processor is configured, if the cache memory is not full, to write the data to the cache memory.

3. The computer system of claim 1, wherein the hard disk drive is operational when the cache memory is disconnected from the cache memory interface.

4. The computer system of claim 1, wherein the processor includes a first register and a second register, wherein the processor is configured to read the value of the flag from the first register, and wherein the processor is configured to determine a size of the cache memory based on a value stored in the second register.

5. The computer system of claim 1, wherein the processor is configured, after copying the content of the cache memory to the hard disk drive, to perform an erase operation on the cache memory.

6. The computer system of claim 1, wherein the cache memory includes a flash memory card, and wherein the cache memory interface includes a slot to receive the flash memory card.

7. The computer system of claim 6, wherein the flash memory card is removable from the cache memory interface and swappable at the cache memory interface with second flash memory card, the second flash memory card having a storage capacity different from a storage capacity of the flash memory card.

8. The computer system of claim 1, wherein the processor is configured to sense a presence of the cache memory using an enumeration process according to a universal serial bus (USB) standard.

9. The computer system of claim 1, wherein the computer system has reduced power consumption if the processor uses the cache memory rather than the hard disk drive.

10. The computer system of claim 1, wherein the processor is configured to read from the cache memory if the flag indicates a presence of the cache memory.

11. The computer system of claim 1, wherein the processor is configured to exchange data with the cache memory if the flag indicates a presence of the cache memory.

12. The computer system of claim 1, wherein the processor is configured to determine a presence of a second cache memory and a size of the second cache memory in response to the second cache memory being connected to the cache memory interface.

13. The computer system of claim 1, wherein the hard disk drive is connected to the cache memory interface via the bus.

14. A method comprising:
performing, by a processor coupled to a hard disk drive and coupled to a cache memory interface configured to be detachably connectable to a cache memory:
detecting a connection of the cache memory at the cache memory interface based on reading a value of a flag; and
after detecting the connection of the cache memory at the cache memory interface, in response to receiving an instruction to write data to the hard disk drive, if the cache memory is full, writing the data to the hard disk drive and copying content of the cache memory to the hard disk drive.

15. The method of claim 14, wherein the processor writes the data directly to the hard disk drive if the value of the flag indicates that the cache memory is not present at the cache memory interface.

16. The method of claim 14, wherein the processor performs an erase operation on the cache memory after copying the content of the cache memory to the hard disk drive.

17. The method of claim 15, wherein the processor initiates a read operation to read data from the cache memory if the flag indicates the cache memory is present at the cache memory interface.

18. The method of claim 15, wherein a presence of the cache memory is sensed using an enumeration process according to a universal serial bus (USB) standard.

19. The method of claim 15, wherein the processor reads the value of the flag from a first register of the processor and detects a size of the cache memory based on reading a value of a second register of the processor.

20. The method of claim 14, wherein the processor determines a presence and a size of a second cache memory in response to the second cache memory being connected to the cache memory interface.

21. A system comprising:
a processor coupled to a hard disk drive and coupled to a cache interface via a bus, the cache interface configured to receive a non-volatile memory that is operable as a hard disk drive cache, the processor configured to:
determine whether the non-volatile memory is coupled to the cache interface based on a value of a stored indicator; and
in response to an instruction to write data to the hard disk drive, if the non-volatile memory is determined to be full, write the data to the hard disk drive and transfer content from the non-volatile memory to the hard disk drive.

22. The system of claim 21, wherein the indicator is stored in a register of the processor, and wherein the processor is configured to initiate a read operation to read data from the non-volatile memory if the indicator stored in the register of the processor indicates the non-volatile memory is connected to the cache interface.

23. The system of claim 21, wherein the processor is configured to determine a presence and a size of the non-volatile memory in response to the non-volatile memory being connected to the cache interface, and wherein the cache interface comprises a flash memory card interface or a universal serial bus (USB) interface.

24. The system of claim 21, wherein the processor is configured to perform an erase operation on the non-volatile memory after transferring the content from the non-volatile memory to the hard disk drive.

25. The system of claim 21, wherein the processor is configured to:
determine if the non-volatile memory is full; and
if the non-volatile memory is not full, write the data to the non-volatile memory in response to the instruction to write the data to the hard disk drive.

* * * * *